No. 884,539. PATENTED APR. 14, 1908.
E. THOMSON.
MOTIVE POWER ENGINE.
APPLICATION FILED JAN. 19, 1901.

5 SHEETS—SHEET 1.

WITNESSES
Henry O. Westendarp
Dugald McK. McKillop

INVENTOR
Elihu Thomson

No. 884,539. PATENTED APR. 14, 1908.
E. THOMSON.
MOTIVE POWER ENGINE.
APPLICATION FILED JAN. 19, 1901.

5 SHEETS—SHEET 2.

WITNESSES.
Henry C. Westendarp.
Dugald McK. McKillop.

INVENTOR.
Elihu Thomson

No. 884,539. PATENTED APR. 14, 1908.
E. THOMSON.
MOTIVE POWER ENGINE.
APPLICATION FILED JAN. 19, 1901.
5 SHEETS—SHEET 3.
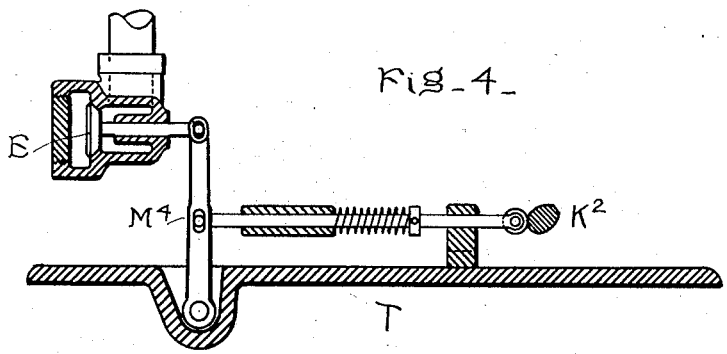
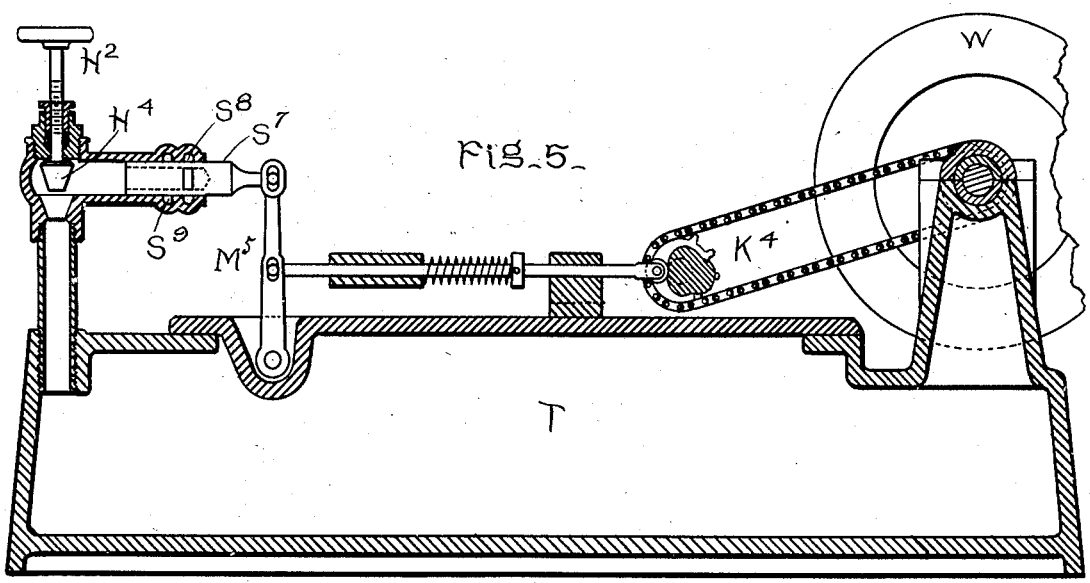
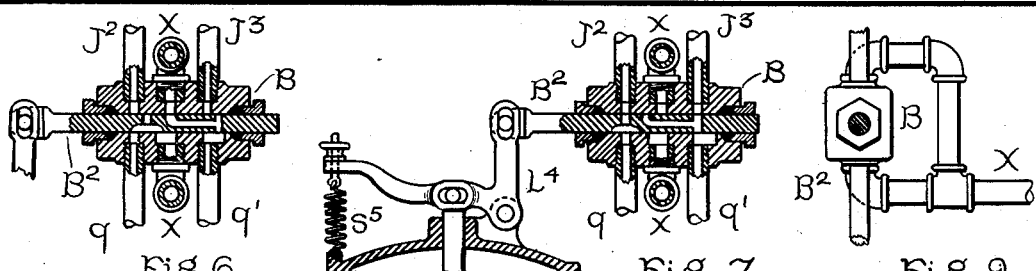
WITNESSES.
Henry O. Westendarp.
Dugald McK. McKillop.
INVENTOR.
Elihu Thomson.

No. 884,539. PATENTED APR. 14, 1908.
E. THOMSON.
MOTIVE POWER ENGINE.
APPLICATION FILED JAN. 19, 1901.

5 SHEETS—SHEET 5.

WITNESSES.
Henry Westendarp.
Dugald McK. McKillop.

INVENTOR
Elihu Thomson

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

MOTIVE-POWER ENGINE.

No. 884,539.     Specification of Letters Patent.     Patented April 14, 1908.

Application filed January 19, 1901. Serial No. 43,948.

*To all whom it may concern:*

Be it known that I, ELIHU THOMSON, a citizen of the United States, and resident of Swampscott, county of Essex, and Commonwealth of Massachusetts, have invented a new and useful Improvement in Motive-Power Engines, of which the following is a specification.

The present invention relates to a form of motive power engine of the internal combustion type, having some features in common with the explosion and the compression types of engines, and others in common with constant pressure engines.

The object of the invention is to secure a simple structure which shall be flexible, safe and economical. In operation the invention utilizes the principle of a constant pressure engine in that it compresses—either in the power cylinder or in a separate cylinder—a quantity of air, and stores the same under pressure in a reservoir. From this reservoir there is drawn at the proper intervals into the power end of the cylinder, the gases in which give out power, compressed air a fraction of which finds its way to a heated chamber adjacent to the cylinder and connected therewith. This chamber preserves separately from the cylinder a body of suitable combustible. Said chamber can be kept hot from the outside, and into it is injected at proper intervals, to be described, preferably kerosene oil, or other hydrocarbon oil, which is burned by the incoming charge of compressed air (not necessarily with explosion) after which the expansion of the heated products exerted on the power piston gives motion to the crank shaft, and furnishes in addition the requisite energy to compress the incoming or new charges of air.

Figure 1:
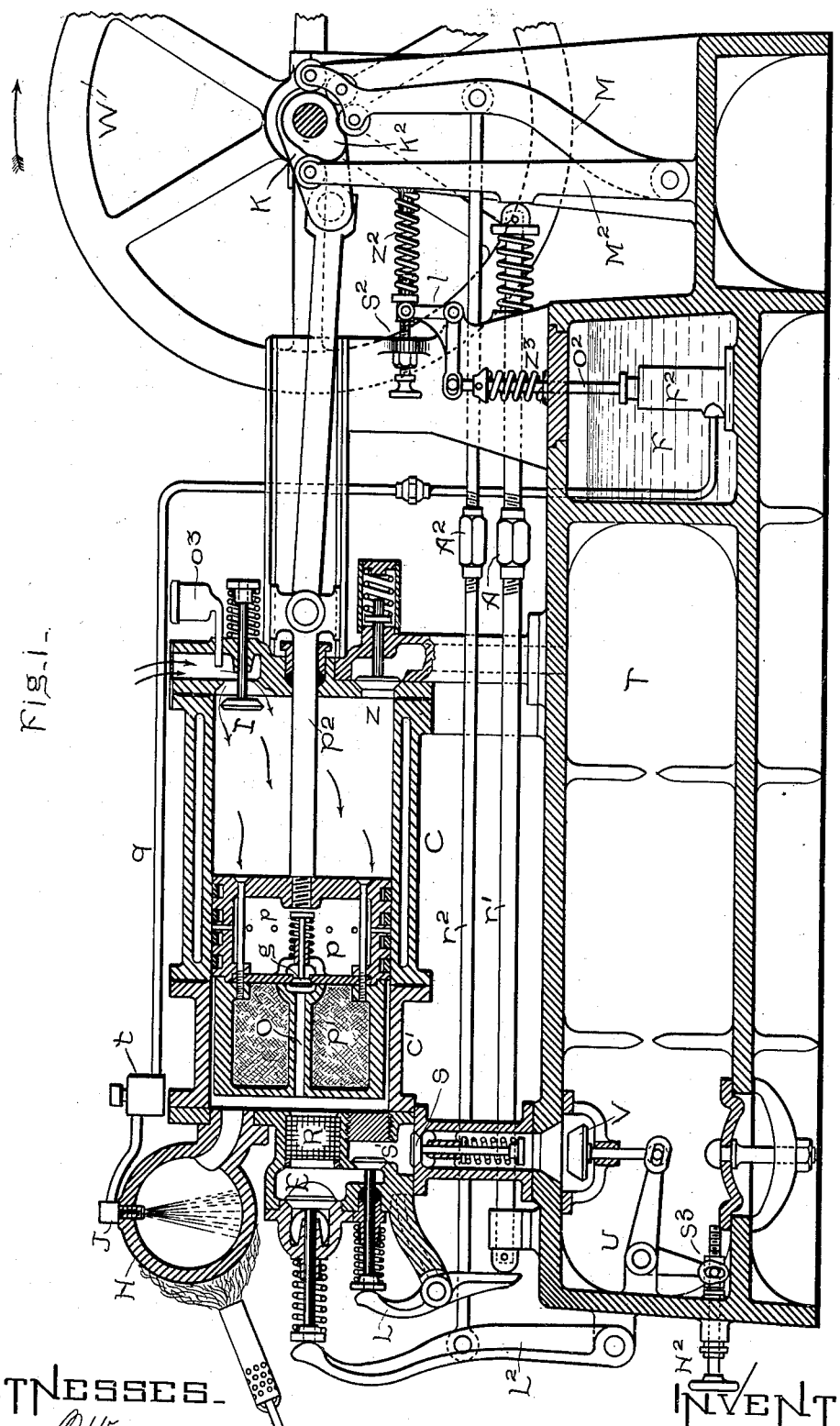
Figure 2:
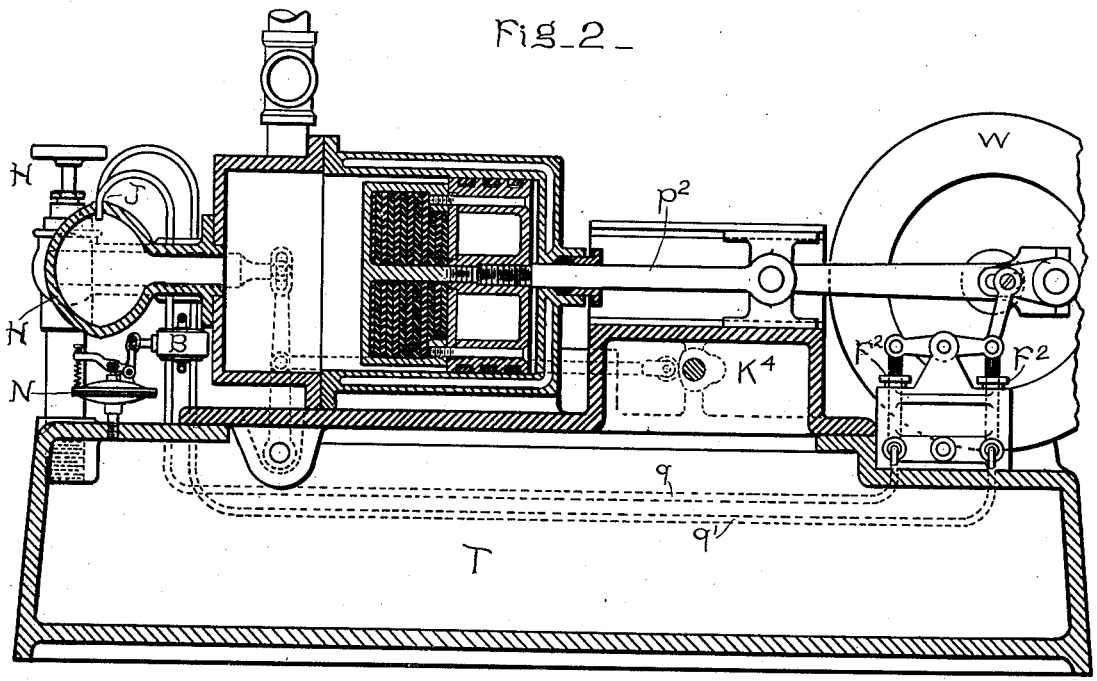
Figure 3:
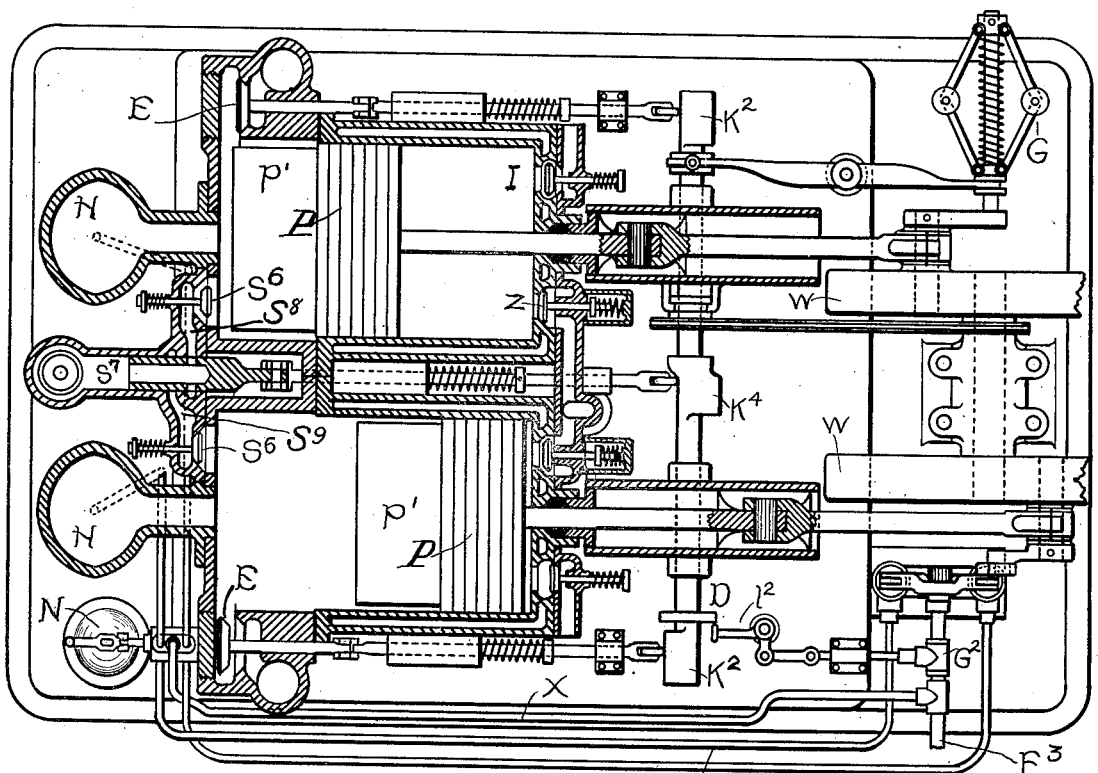

The functions and structure will be better understood by reference to the accompanying drawings and specification, in which Figure 1 is an elevation, partly in section of an engine embodying the invention and arranged to exemplify the principle in a simple way; Figs. 2 and 3 represent a double engine with some modifications; Figs. 4, 5, 6, 7, 8 and 9 are detail views of various parts; and Figs. 10, 11 12 and 13 are diagrammatic views illustrating the actions of the engine.

In Fig. 1, W is a fly-wheel of the engine mounted upon a suitable shaft, upon which a crank K is fixed. The crank K is moved by a suitable connecting rod jointed to a piston rod $P^2$, working in a cylinder, and having a piston P $P^1$ attached. The cylinder is in two portions, preferably, although not necessarily. The portion C is a water jacketed portion. The portion $C^1$, which may be heat insulated from C, is allowed to attain a fairly high temperature. The piston itself is preferably in two sections, though not necessarily so constructed, and the section P is comparatively cool, being in contact with the water jacketed cylinder walls of C, and it has grooves in its exterior fitted with packing rings. Section $P^1$ borne upon section P, is made of refractory metal such as cast nickel or cast iron, and it may be heat insulated from section P, and filled with loose asbestos or some other packing. It is to be understood that while in this description the cylinder acts as a compressor as well as a power source, the compression of air may be accomplished in an entirely different cylinder from the power cylinder of the engine.

Back of the cylinder and fastened to the back cylinder head is a chamber H which can be heated externally to a red heat. It communicates with the cylinder space by a neck shown clearly in the figure. A jet J is mounted, so as to inject at proper intervals a a fine stream of hydrocarbon oil or vapor, the jet being so fine as to divide it up into a spray like condition, preferably. The jet J is fed by an oil pipe $q$ and the check valve $t$ may be mounted near the jet to prevent regurgitation. The pipe $q$ leads from oil-pump $F^2$ immersed in a fuel receptacle F as shown. The oil pump $F^2$ has a piston $O^2$, set in motion by a lever $l$ acting against a spring $Z^3$, the lever $l$ being a bent lever and being prevented from moving too far by stop $s^2$. The lever $l$ is actuated by an upright lever $M^2$, through the agency of the spring $Z^2$, and at the upper end of the lever $M^2$ is a roller which runs upon cam $K^2$ upon the main shaft. The lever $M^2$ has a double function, as it also sets in motion the long rod $r^1$ to open valve $S^1$ through the agency of lever L, which rod and valve may be returned by suitable springs. The cam $K^2$, or a separate cam, may act upon another lever M, which reciprocates a rod $r^2$, which acting on lever $L^2$ operates the exhaust valve E of the engine at suitable intervals.

At A and $A^2$ are right and left threaded connectors whereby the adjustment of the effective lengths of rods $r^1$ $r^2$ may be easily accomplished.

At I, in cylinder C, is an inlet valve closed by a light spring, and arranged to be opened by the pressure of the atmosphere on a slight fall of pressure occurring in the cylinder space. Z is the outlet for compressed air. It has a valve also closed by a light spring and located in a passage leading from the cylinder space to the reservoir or tank T, which is an air-tight inclosure capable of holding air at considerable pressure, several atmospheres at least. Air can be admitted from T through a valve V opened by a bell-crank lever U and nut $S^3$ upon a packed screw $H^2$, serving as a controlling handle. A check valve S is inserted in the passage from valve V up to the cylinder for the purpose of checking any vapors from moving backward towards the tank T. This may be omitted, however, without detriment in most cases.

As shown, there is introduced a small regenerator R, consisting of material with fine interstices for the passage of hot gases from the cylinder and the storage of the heat therefrom, which heat is again taken up on the admission of the incoming air from the tank to the cylinder C. This regenerator may be omitted, and it may in some cases be desirable to do so, inasmuch as the valve spaces near E and $S^1$ may then be diminished, which has the effect of reducing the clearance. Other figures will show forms of engines without the regenerator R. An oil cup $O^3$ is mounted so as to enable a little lubricating oil to be admitted to the engine with the indrawn air through valve I.

Having now described the main features of the engine of my invention, I will explain its operation: Assuming that a moderate charge of air has been pumped into tank T, the initial rotation of the engine will open the valve $S^1$ by lever L actuated by cam $K^2$, just as the crank passes the inner dead point and admit a charge of air to the cylinder which will propel the piston forward. In going forward it will compress the air in front of it, forcing it through valve Z, when pressure has risen to equality with the tank pressure or thereabouts, thus delivering more air to tank T to take the place of that drawn off. If, however, the chamber H has a charge of oil thrown into it just before the admission of air, and the chamber H is hot enough to ignite and vaporize the oil, the incoming air will find its way into the chamber H, producing combustion therein under pressure, which need not take the form of an explosion. The result is to produce a rich flame or hot body of gas in H, which as the piston moves forward receives an addition of oxygen from the still incoming air and that which fills the clearance space, including chamber H. This insures complete combustion. It also insures the maintenance of the pressure during a considerable portion of the stroke following the admission of but a small charge of compressed air, inasmuch as the air on entering is highly heated by the combustion. The pressure so maintained during a considerable portion of the outward stroke suffices to propel the fly-wheel W and compress the charge of air which has entered from valve I and passes out of valve Z into the tank T. As the piston passes the outer dead center the gases in the cylinder back of the piston will have been lowered in pressure while still remaining quite hot. It is understood that the valve $S^1$ is closed long before the complete stroke is finished, in other words the cut-off of valve $S^1$ may be adjusted in accordance with the power and capacity of the engine to take only such an amount of air from chamber T as will provide that the pressure in the chamber T shall at least be maintained and somewhat increased during operation. On the crank passing the outer dead center, the piston returns, and the cam $K^2$ now acts upon lever M to open the exhaust valve E. The hot gases around the piston are now expelled by passing through regenerator R, the high temperature heating the regenerator accordingly. Just before the completion of the instroke, and at the time the position shown in Fig. 1 is reached, the cam $K^2$ has just effected a stroke of the oil pump whereby the oil is injected into H while the pressure is still low, owing to the exhaust valve having just been shut. In fact this injection of oil into H may occur just before the exhaust valve E shuts, and somewhat in advance of the inner dead center. No premature combustion can occur owing to the fact that the whole spaces are at that time filled with dead gas or burned gas. The oil so entering, is however, thoroughly vaporized in the bottom of the hot receptacle H, which at the start is heated by a torch from the outside. Just after the exhaust valve E closes, the cam $K^2$ by further acting upon the lever $M^2$ and continuing the stroke which pumped the oil, carries the lever L into such a position as to open valve $S^1$, and thus open communication between the compressed charge of the tank T and the cylinder. The use of stop $S^2$ is now seen. Its function is to prevent an overcharge of oil being pumped into the cylinder. On the forward movement of $M^2$, the vertical arm of lever $l$ reaches stop $S^2$, and further action of $K^2$ in moving $M^2$ to the left simply compresses spring $Z^2$, and at the same time moves rod $r^1$ so as to open valve $S^1$. It will be understood that in this case the adjustment of the length of $r^1$ is such that valve $S^1$ does not open until after the oil pump stroke is made. This, while not essential, is desirable, inasmuch as the oil is then pumped against substantially no back pressure, it being found by experience that where oil fuel has to be pumped against a considerable back pressure the action of the pump is liable to be more or less irregular unless its construction is most perfect. As soon as the incoming air reaches the hot ball H with the contained oil vapor, combustion takes place, and this begins just before the dead center is passed, while the pressure continues to rise by the valve $S^1$ being open until the pressure in the ball H, back of the piston, is equal to the tank pressure. Meanwhile, the incoming air from $S^1$ passing regenerator R has taken up some of the heat given to it during exhaust. It is, therefore, in condition to easily burn the oil. Valve $S^1$ may be kept open during a fraction of the outer stroke after the crank has passed its inner center. Combustion continues and there results a body of rich flame in receptacle $H_r$ and a body of air nearly free from combustible in the cylinder back of the piston. Now, if valve $S^1$ be closed after a certain portion of the stroke has been effected, the continued expansion of the gases following up the motion of the piston, brings the hot flame filled gas from H into admixture with the colder gas within the cylinder. This completes the combustion, and insures that the combustible itself shall be thoroughly burned in excess of air, with the result of a clean, inodorous, invisible exhaust. As conducive to this state of affairs the section $C^1$ of the cylinder and the back part $P^1$ of the piston reach a high temperature during operation, the flame gases being for the major part of the time kept out of contact with the lubricated walls of the cylinder. In fact section $C^1$ of the cylinder and the back head of the cylinder may be surrounded by a non-conductor and protected from air currents, so that they may continue at a high temperature. The heat of receptacle H is usually maintained by the combustion going on therein, at the desired temperature for operation, so as to be independent of external heating after the start. If, however, the engine is under very light load, and is provided with a governor for cutting off the amount of fuel in accordance with the removal of load it may be well to continue to heat the receptacle H externally.

The function of the spring $Z^3$ is simply to return the oil pump piston or piston rod $O^2$, so as to avoid lost motion. A similar function is possessed by the spring on rod $r^1$ near lever $M^2$. While cam $K^2$ has been described as performing the various functions, it is evident that separate cams may be employed; one to give the motion to the oil pump piston; another to open the inlet valve $S^1$ at proper times; a third to open the exhaust valve.

The object of the present Fig. 1 is to explain in the simplest way the functions and the structure of the machine. It will also be understood that an engine may be constructed with several compressing cylinders, or several power cylinders; that the engine may be provided with a governing apparatus acting to change the interval of opening the admission valve $S^1$, and to change the amount of fuel admitted to the engine. These matters form no special part of the present invention.

In order to prevent the possibility of any of the burned gases escaping by the piston P $P^1$ and mixing with the incoming charge of air entering through the valve I, before said charge is transferred through valve Z, an escape for gases tending to pass the piston is provided. This escape may be useful in case the packing rings are not well fitted to the walls of the cylinder. Section P is provided with four packing rings and about the middle and between any two rings with a series of openings $p$ in the interior hollow space. These radial openings from the exterior of the piston to its interior are sufficiently numerous to provide free escape for any gas under pressure tending to pass the rings. Arriving in the inner chamber of piston $p$ these gases accumulate a slight pressure sufficient to open a valve $g$ when the exhaust valve E is open. At this time the accumulated leakage gas escapes the valve $g$ and passes through a passage O to join the exhaust gases passing out through E. Any tendency for gases to move in the opposite direction through valve $g$ is met by its acting as a check. This addition to the engine is unessential when the packing of the piston is good, and it is also less useful on the larger sizes, inasmuch as the proportion of leakage is apt to be less.

Figs. 2 and 3 show a double engine constructed in accordance with my invention. As before, W, W, are wheels acting the part of fly-wheels in which are two cranks, one for each cylinder. One of the cylinders is shown in elevation and section in Fig. 2, and both are shown in Fig. 3 with the pistons P, P', in opposite positions. E and E are the exhaust valves, $K^2$ $K^2$ are the cams mounted on a separate cam shaft for operating the valves. This shaft is geared to the main shaft. $K^4$ is a cam upon the cam shaft for operating the air valve $S^7$ to admit compressed air to either cylinder. The valve $S^7$ is a piston or slide valve receiving air at its hollow interior and distributing it through ports alternately to one or the other cylinder of the engine, check valves $S^6$ $S^6$ being provided to prevent any return. H H are hot receptacles, J, J, the jets and $q$ $q'$ pipes feeding oil to the same. T is the tank for compressed air. $F^3$ is a feed pipe leading from an oil supply. G is a governor which acts to move longitudinally the cam shaft on which the cams K² K² and K⁴ are mounted whereby on an excess of speed either or both of the following actions are accomplished. A variation in the form of cam K⁴ as operating to move valve S⁷ by a changed position of the shaft may cause said valve to admit less or more air in accordance with well known principles. A disk D, fixed upon the cam shaft, also moved by the governor on increase of speed, will act upon one arm of the bent lever $l^2$, and partially or entirely close a valve G² in the fuel supply pipe F³, leading to the pumps F² F², which are connected to work reciprocally and give alternate charges to one and to the other receptacle. Each cylinder is provided with an inlet for the entrance of air, such as I, and an exit valve Z for the compressed air, the valve Z being in a conduit leading from the cylinder to the tank or reservoir T. As the tank pressure rises it may be allowed to operate upon a flexible diaphragm indicated at N. This diaphragm is suitably connected to operate a by-pass valve B² in a box B, whereby oil which is being pumped from the pumps through $q$ $q^1$ from the respective pumps is allowed to flow back in greater or less amount to the fuel supply pipe F³, i. e. the governor moving longitudinally the intermediate shaft upon which the cams are mounted the amount of air admitted to the cylinders for combustion may be varied, and at the same time the amount of oil or fuel admitted to the receptacles H H may be changed. The operation is substantially the same as that of the machine, Fig. 1, except that the regenerator R is omitted from the design and the inlet valve S⁷ serves for both cylinders of the engine and the check valves S⁶ S⁶ are put on the cylinder side of the valve S⁷. The pressure responsive diaphragm N acts to by-pass the oil feed or vary the oil which reaches the receptacles H H in accordance with the tank pressure, to which pressure the diaphragm itself responds. It cuts off or diminishes the oil when the pressure rises to too great an amount. If the speed of the engine rises beyond a certain amount, the governor G properly adjusted operates centrifugally to move the shaft upon which the cams K² K² and K⁴ are mounted, forcing the disk over and closing the intake pipe F³ by valve G², thus cutting off the feed of oil. Cam K⁴ is so formed that a movement which cuts off the oil at the same time lessens the stroke of valve S⁷ so that less air is admitted to the cylinders by the valve S⁷. Some of these parts are shown more in detail in Figs. 4, 5, 6, 7, 8 and 9. In Fig. 4, K² is the cam which while revolving presses back a roller bearing thereon, and by an upright lever M⁴ the valve E, which is the exhaust valve, is opened and closed successively on the revolution of the cam.

In Fig. 5, H² H⁴ represent the throttle valve or shut off valve controlling the communication between the tank T and the inlet valve S⁷ which is operated by the revolving cam K⁴ on the cam shaft which is driven from the main shaft upon which the wheel W is mounted. Here the upright lever M⁵ is reciprocated by the action of the cam K⁴ and its movement reciprocates valve S⁷. Port S⁸ is shown as open in the position of the valve S⁷ and port S⁹ closed. Port S⁸ communicates, as seen in Fig. 3, with the upper cylinder in the figure, and port S⁹ with the lower cylinder in the figure. The opening of these ports and the communication with the tank T is adjusted so as to give the admission of air at the proper time, as described in connection with Fig. 1. The shape of the cam K⁴ may be varied along the cam shaft so that its longitudinal motion brings different portions of the cam into operation and varies its action in any desired manner.

In Fig. 7 N is the diaphragm responsive to pressure underneath it from the tank T. This pressure is exerted in the usual way against a plunger bearing on the diaphragm and through a bent lever L⁴ against a spring S⁵. The lever L⁴ is connected to a sliding valve B² in the box B, which valve controls the admission of oil to pipes J² J³ from pipes $q$ $q^1$ respectively. Between these pipes are connections as shown, to the returning by-pass pipe X. The pipes $q$ $q^1$ receive their fuel or oil respectively from pumps F² F², Figs. 2 and 3 alternately in the position of valve B, as shown in Fig. 6. It will be evident that this oil cannot pass from pipe $q$ to J², as the valve has closed the connection, but it passes freely through a port in the valve into the by-pass or return X. The oil pump is thus ineffective in feeding the pipe J² which is connected to one of the pipes J of the hot receptacle H. In like manner pipe $q^1$ is ineffective to deliver oil to the pipe J³ connected to the other jet of the other receptacle H. Here a port in valve B² has open communication between $q^1$, and a port leading to X as plainly seen. This would be the condition or set of the valve when the diaphragm N has been raised by excessive pressure in the tank T, and when the pressure suitably falls the valve is thrown to the position shown in Fig. 7. Now, there is free communication between $q$ and J², so that oil is fed from the respective pump to the respective hot receptacle H, to which pipe J² leads, and oil pipe $q^1$ is in similar direct connection from small ports in B² using pipe J³ leading to the other receptacle, the connection X X being cut off at this time by no ports being open to take from any of the pipes or passages. This is the position during normal running without excess of tank pressure. The pumping capacity of the engine for air being always in excess of that demanded to run the engine, the pressure in the tank T gradually increases until a limit of pressure is reached which is sufficient to push forward the diaphragm N and shift the oil control valve B², at which time, due to the diminished supply of oil reaching the hot receptacles H, H, the drain of compressed air from the tank is somewhat increased and a fall of pressure results, allowing the parts to assume their normal operation.

The diagrammatic views, Figs. 10, 11, 12 and 13 are intended to show in an outline way the actions of the engine during the different parts of its stroke. Instead of cams for working the valves, eccentrics are indicated at K² K⁴. In these figures corresponding parts are marked by the same letters as before, though the construction of the particular parts themselves is modified, for ease of explanation.

Figure 10:
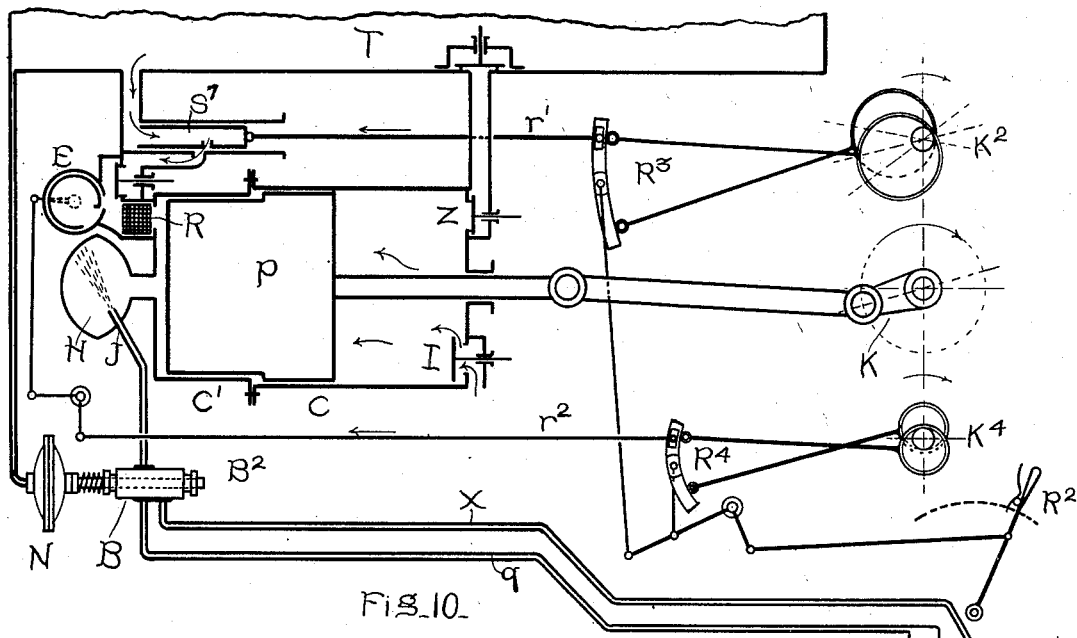
Figure 12:
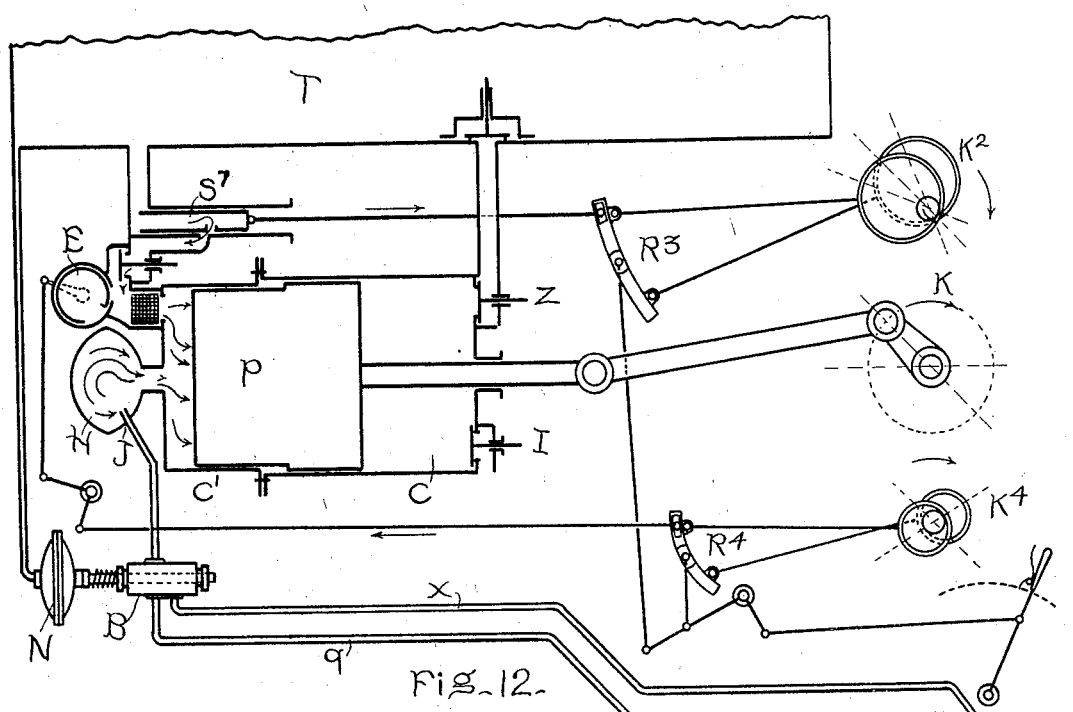
Figure 13:
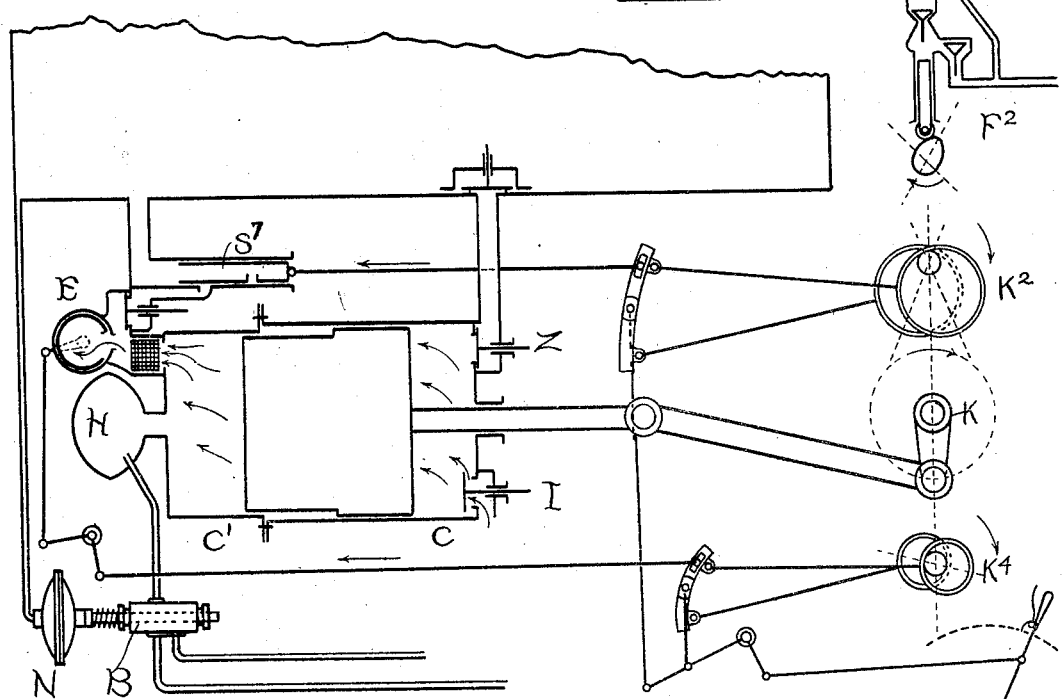

Taking Fig. 10, it will be found that the piston P is in the position of approach to its inner dead center, as shown by reference to crank K. At this moment it will be seen that the valve S⁷ has just opened communication with the reservoir T and here air begins to move under pressure past valve S⁷ through regenerator R, into the space of the cylinder section C¹ unoccupied by the piston. The exhaust valve shown as a rotary valve, is indicated as just closed and as controlled by eccentric K⁴. The motions of these valves are capable of reversal by link motions or eccentrics, being double for that purpose and controlled by the reversing lever R². This, however, is, of course, unessential and merely illustrative of one of the ways of reversing the motions. The oil-pump F² has its plunger in motion, as indicated, forcing a charge of oil through pipe q, and to jet J in the hot receptacle H. The incoming air meeting the oil, produces combustion, and the condition, Fig. 12, is arrived at while the oil has ceased flowing, the air still entering through valve S⁷, and piston P moving outward, crank K having arrived at the position of about 45° on the outward stroke. The air in front of piston P, i. e. in the space C, is now being compressed, both valves I and Z being shut. The valve S⁷ may be set to cut off at any desired point on its outward stroke. This can be accomplished by the adjustment of the link R³; R⁴ being left invariable.

Figure 11:
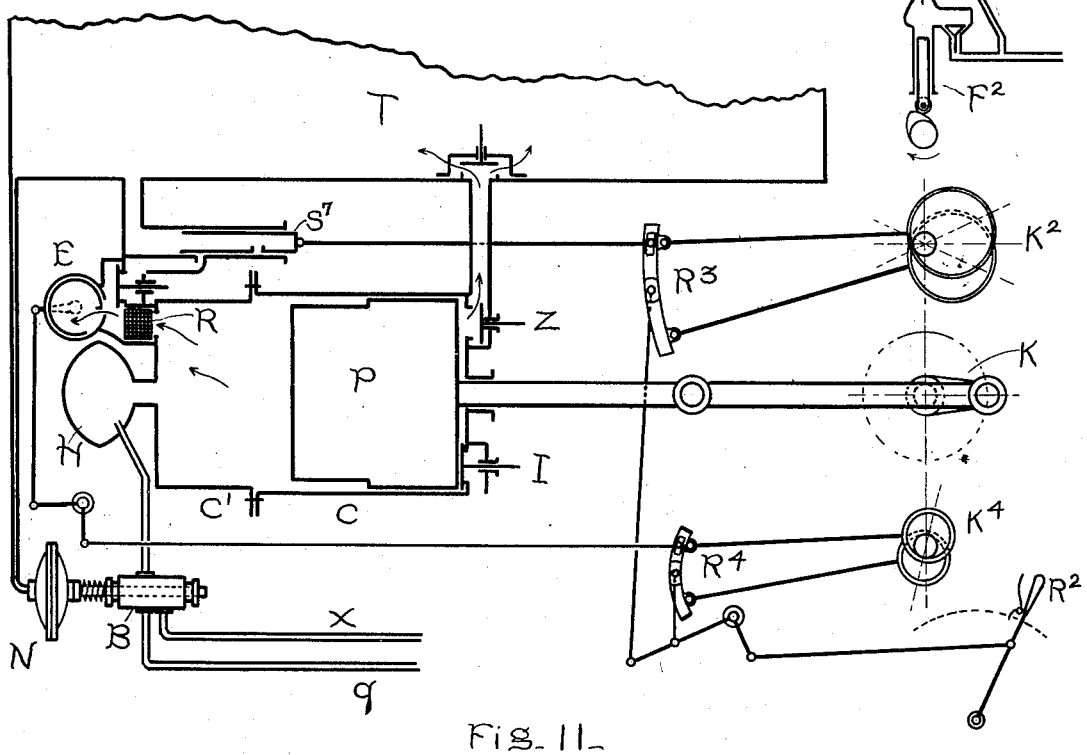

Fig. 11 illustrates the operating conditions when the piston and crank are at the outer limit of their movement. The hot expanded gases continue their action until the condition in Fig. 11 is reached and the piston is now at its farthest position forward, or on the outer dead point, as indicated by crank K. The compressed air in front of it is being driven into reservoir T, through valve Z. The exhaust valve E has just been opened and the exhaust begins by the flowing of hot gases from the cylinder and from receptacle H, through regenerator R, and out. The continuing motion of the shaft and crank K brings us to position, Fig. 13, for example, where the mid stroke inward is reached. Here the valve I is open, allowing air to enter the forward end of the cylinder, and valve E continues open for exhaust, valve S⁷ being, of course, shut. This action continues until near the completion of the inward stroke when the condition is again arrived at as in Fig. 10, i. e. just as the exhaust valve E, is about to close, the oil may be pumped in through jet J, while the compressed air valve S⁷ is incipiently opened immediately thereafter. There is nothing to prevent the oil being pumped in even after valve S⁷ has been opened, but it is usually better to have this process completed before the entering of the air charge.

What I claim as new and desire to secure by Letters Patent of the United States is:

1. In an internal combustion engine, the combination of a cylinder, a hot receptacle in open communication with the cylinder, a fuel supply conduit for admitting oil to the receptacle while the pressure in the cylinder is a minimum due to the action of the exhaust valve, means for supplying compressed air at approximately constant pressure to the cylinder after the admission of oil to the receptacle, whereby oil vaporized in the receptacle is brought into contact with air from the compressed air supply, the combustion of the two filling the working space in the cylinder with the products of combustion under pressure, an exhaust valve for said products, and means for keeping the exhaust valve open while the piston travels from its outer position to a point near its inner position and then closing said valve.

2. In an internal combustion engine, the combination of a cylinder, a piston reciprocating therein, a valve controlling the admission of air into the working space in the cylinder, an exhaust valve, means for keeping the exhaust valve open while the piston travels from its outer position to a point near its inner position and then closing the valve, a hot receptacle connected to the cylinder space, means for supplying fuel to said receptacle immediately after the closing of the exhaust valve to form a body of combustible separate from the cylinder, and means for opening the air admission valve after the closing of the exhaust valve and closing it after a portion of the following out-stroke of the piston has been made.

3. In an internal combustion engine, the combination of a cylinder, a regenerator in the passage leading to the exhaust from the working space within the cylinder and also leading to an inlet for compressed air from a storage tank, a hot receptacle having a port connecting it with the working space of the cylinder, means for injecting oil into the receptacle before the admission of air to the cylinder to form a body of combustible separate from the cylinder, an exhaust valve, and means for opening said valve when the piston is adjacent the outer limit of its travel, keeping it open until near the inner limit of its travel and closing it at substantially the same time that the fuel admission occurs.

4. In an internal combustion engine, the combination of an air pump, a tank for receiving the air, a piston, a cylinder having a connection with the tank, said connection being controlled by a valve moving at intervals in synchronism with the rotation of the engine, an exhaust valve to control the outlet of gases from the cylinder, a hot receptacle communicating by an open passage with the working space of the cylinder, an oil supply, means for delivering oil from the supply to the receptacle before the air valve is opened to form a body of combustible separate from the cylinder, and means for opening the exhaust valve when the piston is near the outer limit of its stroke, keeping it open until near the inner limit of its stroke and closing it at substantially the same time that the oil is admitted to the cylinder.

5. In an internal combustion engine, the combination of a power cylinder, a piston reciprocating therein, a valve controlling the admission of air into the working space of said cylinder, an exhaust valve, means for keeping said exhaust valve open while the piston travels from its outer position to a point near its inner position and then closing said valve, means for supplying fuel to the cylinder immediately after the closing of the exhaust valve, and means for opening the air admission valve after the closing of the exhaust valve and closing it after a portion of the following out-stroke of the piston has been made.

6. In an internal combustion engine, the combination of a cylinder having a piston, a hot receptacle in open communication with the cylinder, means for supplying fuel to the receptacle to form a body of combustible separate from the cylinder, an air pump, a reservoir for receiving the air from the pump, means for admitting air to the cylinder after the receptacle is supplied, mechanism operated by the pressure in the reservoir for controlling the operation of the fuel supplying means, an exhaust valve, and means for opening the valve when the piston is adjacent the outer limit of its travel, keeping it open until near the inner end of its travel, and closing it at substantially the same time that the fuel admission occurs.

7. In an internal combustion engine, a cylinder, a piston reciprocating therein, a hot receptacle opening into the working space of said cylinder, means for supplying liquid fuel to the receptacle just prior to the out-stroke of said piston to form a body of combustible separate from the cylinder, means for supplying compressed air to the cylinder at approximately constant pressure during the first portion of the out-stroke of the piston, an exhaust valve, and means for operating the valve which opens it when the piston is near the outer limit of its travel, keeps the valve open until the piston is near the inner end of its stroke and closes the valve at substantially the same time that the fuel admission occurs.

8. In an internal combustion engine, a combustion chamber, a hot receptacle connected thereto by an open passage, said combustion chamber being formed with a second passage through which compressed air may enter it, said passages being separated from each other by an appreciable distance, and means for supplying liquid fuel to the receptacle to form a body of combustible separate from the cylinder.

9. In an internal combustion engine, the combination of a compressed air reservoir, means for supplying air to the engine cylinder from the reservoir, means for supplying fuel to the cylinder, governing mechanism for controlling the supplies of air and fuel, a by-pass in the fuel supply, and means operated by the pressure in said reservoir for regulating the action of the by-pass.

In witness whereof I have hereto set my hand this 16th day of January, 1907.

ELIHU THOMSON.

Witnesses:
DUGALD McK. McKILLOP,
HENRY O. WESTENDARP.